United States Patent [19]

Barnes et al.

[11] Patent Number: 4,525,806
[45] Date of Patent: Jun. 25, 1985

[54] PRINTER SHARING BY PLURALITY OF DISPLAY UNITS IN WORD PROCESSING SYSTEM

[75] Inventors: Johnny G. Barnes, Austin; John A. Hooten, Round Rock; Patrick J. Hurley, Austin; Ernest L. Miller, Georgetown, all of Tex.

[73] Assignee: International Business Machines Corporation, Armonk, N.Y.

[21] Appl. No.: 537,618

[22] Filed: Sep. 30, 1983

Related U.S. Application Data

[63] Continuation of Ser. No. 247,969, Mar. 26, 1981, abandoned.

[51] Int. Cl.³ .................... G06F 3/12; G06F 15/16
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,934,230 | 1/1976 | Salle et al. | 364/200 |
| 3,950,731 | 4/1976 | Quellette . | |
| 4,071,910 | 1/1978 | Stockebrand et al. | 364/900 |
| 4,126,893 | 11/1978 | Cronshaw et al. | 364/200 |
| 4,137,564 | 1/1979 | Spencer | 364/200 |
| 4,138,719 | 2/1979 | Swanstrom et al. | 364/200 |
| 4,161,777 | 7/1979 | Ying | 364/200 |
| 4,161,779 | 7/1979 | Spencer et al. | 364/200 |
| 4,191,997 | 3/1980 | Luiz | 364/200 |

OTHER PUBLICATIONS

Computer Design, vol. 13, No. 3, 3/74, pp. 81-86, Concord, (USA), G. Reyling, Jr.: "Performance and Control of *Multiple Microprocessor System*".
Siemens Forschungs— & Entwicklungs—Berichte, vol. 7, No. 6, 1978, pp. 322-324, Berlin, (DE); O. Zimmerl: "Master-Slave Configurations with One-Chip Microprocessors".
*IBM Tech. Discl. Bulletin,* vol. 22, No. 10, Mar. 1980, pp. 4586-4590, N.Y., (U.S.A); H. Y. Julius Burger et al.: "Multi-Peer Access Loop Communication System".

*Primary Examiner*—Eddie P. Chan
*Attorney, Agent, or Firm*—J. B. Kraft; J. F. Villella, Jr.

[57] ABSTRACT

The present disclosure relates to word processing systems wherein material to be printed is formatted on a display unit having a display, e.g., CRT display and a text formatting processor which formats the display material. The display unit further includes means for controlling a printer to print the formatted text. In the present invention a plurality of such display units share a printer. This is accomplished by having at least one of the display units comprise means for controlling the sharing of the printer by the plurality of display units and each of the other display units communicate with the printer through these printer sharing control means. At least part of this printer sharing control means is contained in the text formatting processor of the primary display unit through which the other display units communicate with the printer.

6 Claims, 4 Drawing Figures

PRINTER SHARING BY PLURALITY OF DISPLAY UNITS IN WORD PROCESSING SYSTEM

This is a continuation of application Ser. No. 247,969, filed Mar. 26, 1981, now abandoned.

BACKGROUND OF THE INVENTION

1. Field of the Invention

This invention relates to word processing systems. More particularly, it relates to word processing systems wherein a plurality of display units share a single printer.

2. Description of the Prior Art

In the past decade word processing systems have rapidly assumed a position of great importance in the business equipment field. At the present stage, at a little more than the cost of a group of high quality typewriters, most business organizations can purchase a word processing system wherein the material to be produced is formatted on one or more display units each of which has a text formatting microprocessor, means such as a CRT for displaying the text and means for controlling a printer to print the finalized formatted text. Word processing systems strive for higher quality printed text produced more rapidly and efficiently than traditional means for producing printed text copy. The field is a highly competitive one with a great many companies marketing high quality efficient equipment. Because of the highly competitive nature of the field, cost reduction without sacrifice in quality has been a major goal in the field. Some typical word processing systems are described in U.S. Pat. Nos. 4,137,564, 4,126,893 and 4,138,719.

The present invention is directed towards such cost reduction in word processing systems wherein a plurality of display units share a single printer. Since about 65–95 percent of the time in producing a final hard copy is spent by the operator on the display unit in formatting the text to be involved in the hard copy and only 5–35 percent of the time spent in actual printing, the field has been moving in the direction of expedients whereby a plurality of display units are multiplexed, i.e., share a single printer.

SUMMARY OF THE PRESENT INVENTION

The present invention provides a word processing system wherein there is no separate multiplexing unit. Rather, any one of the display units in a plurality of display units has the capability of acting as the primary display unit through which remaining display units are multiplexed and communicate with the printer. In this manner, multiplexing capability need not be predetermined at the manufacturing stage, rather, in the field and during operation, decisions may be made to designate any one of the display units as the primary display unit and having the remaining units multiplexed through this primary display unit communicating with and controlling the printer. In its operational stage, the present word processing system comprises a printer and a primary display unit having a text formatting processor, means for displaying the text and means for controlling the printer to print the formatted text. The invention further includes the improvement wherein the primary display unit comprises means for controlling the sharing of the printer by the primary display unit and at least one other unit, the printer sharing means being inactive in the absence of another display unit connected to the primary unit. The system also includes means for selectively connecting the primary display unit to at least one other display unit and means responsive to this connection for activating the printer sharing control means in the primary unit whereby the other display unit communicates with the printer through these printer sharing control means.

In accordance with a more particular aspect, each of the display units comprises means for controlling the sharing of the printer by the plurality of display units; the printer sharing control means in each of the display units is normally inactive. The system further includes means for selectively connecting a printer sharing adapter to one of the display units to thereby make the display unit the primary display unit and means for selectively connecting the other display units through the adapter to this primary display unit. The primary display unit further includes means responsive to such a connection to activate the printer sharing control means in the primary display unit whereby the other display units communicate with the printer through the activated printer sharing control means.

BRIEF DESCRIPTION OF THE DRAWINGS

Referring now to the drawings, wherein a preferred embodiment of the invention is illustrated, and wherein like reference numerals are used throughout to designate like parts.

Detailed Description of the Preferred Embodiment

Figure 1:
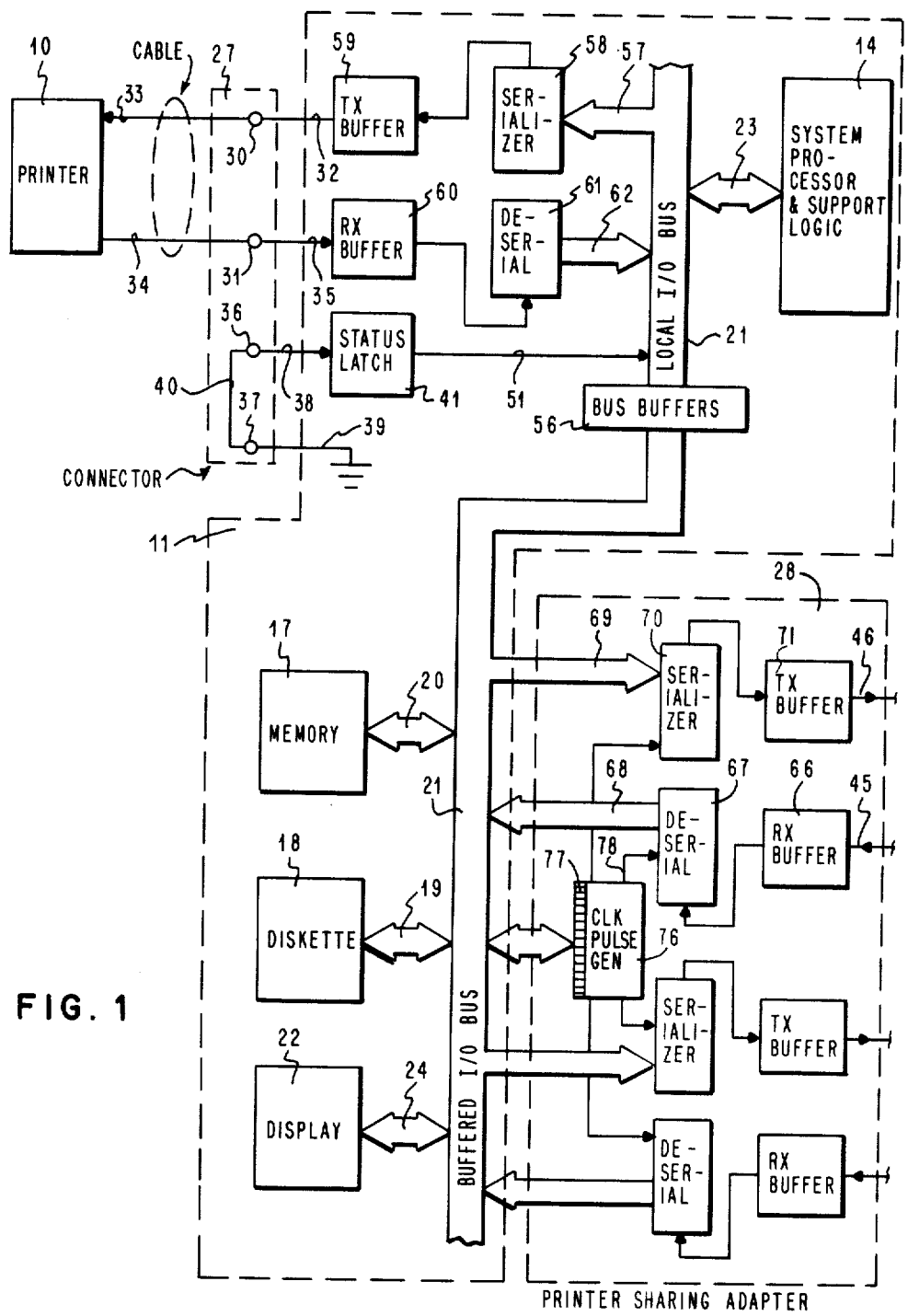
FIGS. 1 and 2 are a continuous diagrammatic representation of the logic of the present system.
Figure 2:
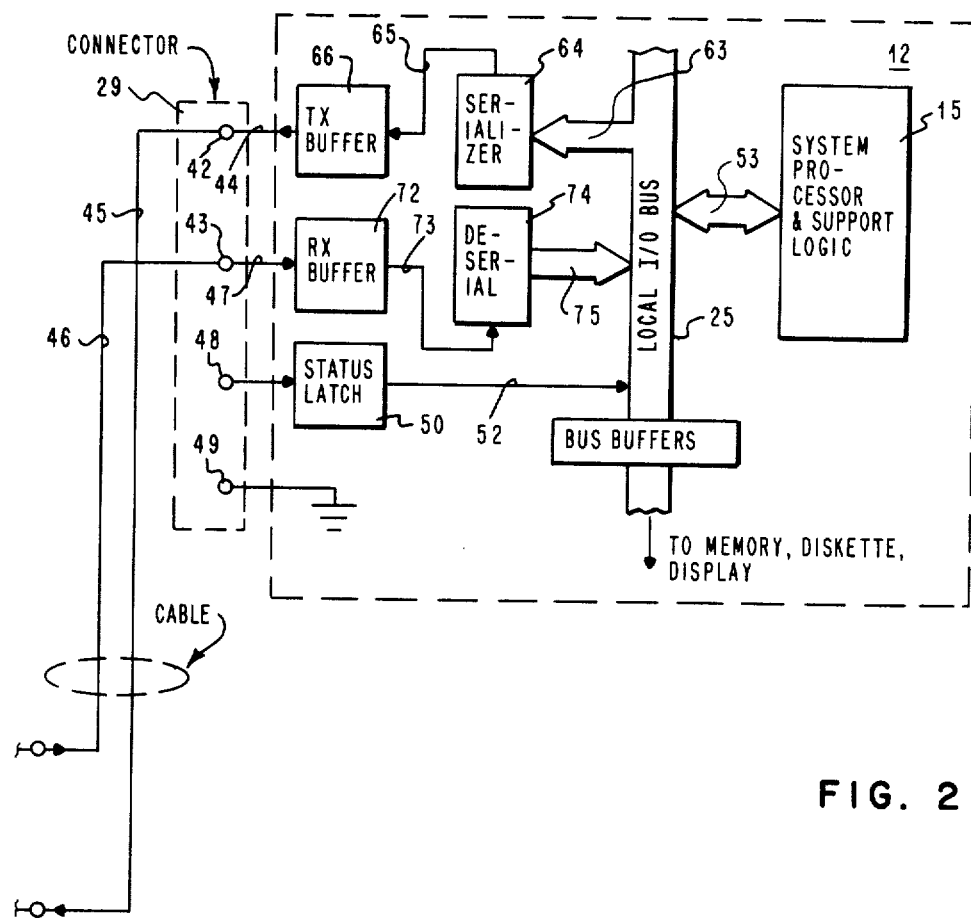
Figure 2:
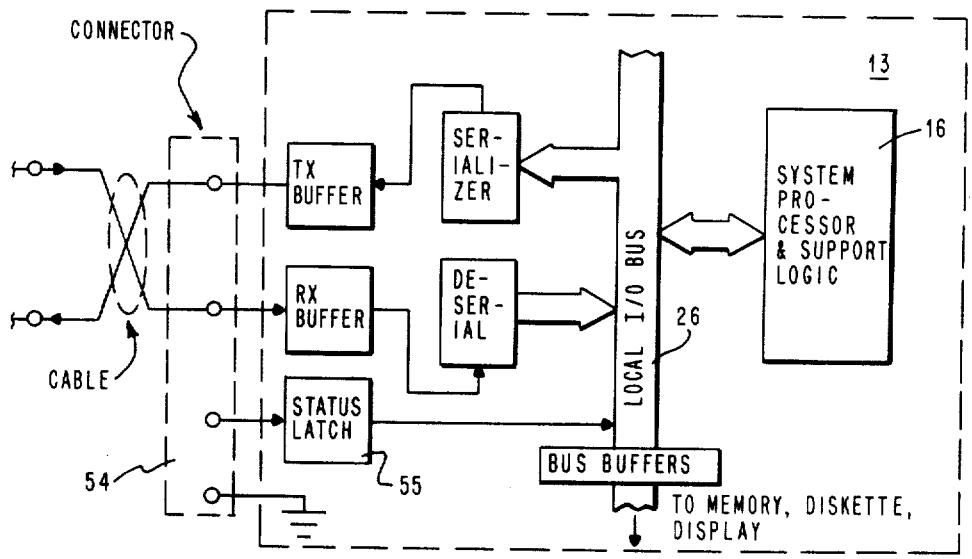

The logic for the system of the present invention is shown in FIGS. 1 and 2. The system comprises a printer 10 which is shared by three display unit work stations 11, 12 and 13. As will be hereinafter described in greater detail, the three display units are multiplexed so that display unit 11 is the primary display unit, and units 12 and 13 are secondary display units, i.e., all communications from secondary display units 12 and 13 with printer 10 must pass through the primary display unit 11 and the microprocessor 14 of the primary display unit functions to control all communications with the printer including the communications from secondary display units 12 and 13. It should be noted that secondary display units 12 and 13 are substantially identical in structure with primary display unit 11. Secondary display units 12 and 13 contain microprocessors 15 and 16 substantially the same as microprocessor 14. Primary display unit 11 contains an operational memory 17 which includes the operational program utilized by microprocessor 14 in controlling the multiplexing and other operations. This memory may conveniently be a conventional 32K RAM memory. Similarly, secondary display units 12 and 13 contain such operational memories (not shown).

Primary work station 11 also contains a serial bulk storage memory 18, conveniently a diskette memory in which a wide variety of operational and control programs may be stored and selectively loaded into operational memory 17 via buses 19 and 20 communicating with main bus 21. Likewise, secondary display unit work stations 12 and 13 contain such diskette memories (not shown). Primary work station contains the standard display which may be found in any conventional word processing system work station.

Display 22 is controlled by microprocessor 14 which issues and receives data from display 22 via buses 23 and 24 communicating through main bus 21. Standard text processing and formatting operations may be carried out using display unit 22 under control of microproccessor 14. Some typical word processing and formatting operations which may be carried out using the combination of display 22 and microprocessor 14 are described in detail in U.S. Pat. Nos. 4,137,564, 4,126,893 and 4,138,719.

In a similar fashion microprocessors 15 and 16 in secondary work stations 12 and 13, respectively, communicate via main buses 25 and 26 with display element (not shown) to perform similar word processing operations.

It should be noted that in their word processing and formatting operations, secondary display unit work stations 12 and 13 operate substantially in the same manner as primary display unit work station 11. It is only in the communication and control of the printer 10 to produce the final hard copy of the data which has been formatted in the secondary display unit that secondary display unit work stations 12 and 13 do not directly communicate with printer 10 but rather communicate through primary display unit work station 11 in the manner to be hereinafter described in detail.

Display unit work stations 11, 12 and 13 are substantially identical, i.e., they are interchangeable. Any one of the three can be the primary display unit work station and the other two secondary display unit work station. Each display unit work station has dormant or inactive capability to act as the primary work station. This dormant capability includes programs stored in its bulk or diskette memory 18. Mircroprocessors 14, 15 and 16 have the capability of determining whether the display unit work station has been selected to function as a primary or as a secondary work station and to activate appropriate logic and memory to permit the work station to function as a primary display unit work station if it has been so selected, or if it has been selected to be a secondary work station, to activate appropriate logic and memory to permit it to function as a secondary work station.

The determination is made as follows. Where a display unit work station such as display unit work station 11 is plugged directly into the printer and is to function as a primary display unit work station, it is connected with a connector 27. If the display unit is to function as a secondary display unit, it is connected to the printer sharing adapter unit 28 which will be described hereinafter in greater detail through connectors like connectors 29 and 54. With respect to direct connector 27, it is to be noted that in addition to terminals 30 and 31 which couple transmit lines 32 and 33 and receive lines 34 and 35, respectively, between primary display unit work station 11 and printer 10, terminal 36 and 37 which receive lines 38 and 39 from primary display unit work station 11 are shorted via line 40. This puts status latch 41 in primary work station at ground level. On the other hand, let us consider a connector such as connector 29 which is not directly connected to the printer 10 but rather in the case of secondary display unit work station 12 connected to printer sharing adapter 28. Like connector 27, connector 29 has a pair of terminals 42 and 43, respectively connecting transmit lines 44 and 45 and receive lines 46 and 47. However, terminals 48 and 49 in connector 29 are not shorted to each other. Consequently, status latch 50 in secondary display work station 12 will not be at ground.

Accordingly, it is the condition of this status latch by which the display unit work station microprocessor determines whether the work station is to function as a primary or as a secondary work station. In this respect, let us consider primary work station 11. The condition of status latch 41 is transmitted to microprocessor 14 via line 51 communicating through main bus 21 and bus 23 to the microprocessor 14. When the status latch communicates to microprocessor 14 in the appropriate timing sequence (not shown) that it is at ground, microprocessor 14 communicates with diskette memory 18 and has loaded via main bus 21 into operational memory 17 the selected programs which will permit microprocessor 14 to control the functioning of display unit work station 11 as a primary work station. On the other hand with respect to secondary work station 12, at the appropriate time sequence, the condition that status latch 50 is not at ground is communicated via line 52 and main bus 25 and bus 53 to microprocessor 15. Microprocessor 15 thereby determines that status latch 50 is not at ground and consequently display unit work station 12 is to function as a secondary display unit work station. Accordingly, microprocessor 15 sends appropriate commands over main bus 25 to load programs from its associated diskette memory into its operational memory which will permit the operation of microprocessor 15 to control the operation of the display unit work station as a secondary work station.

In the same manner, since display unit work station 13 is to function as a secondary display unit work station, the condition of connector 54 produces a non-ground condition on status latch 55 and microprocessor 16 operates in the manner described above to set up and control the operation of display unit work station 13 as a secondary display unit work station.

Let us now describe how communications between the primary and secondary work station and the printer are carried out. First, with respect to communications between the primary work station directly with the printer. It should be noted that in the system being described the interface between the work station and the printer is a serial interface while inside of the work station, i.e., communication to and from the microprocessor and other units involve parallel interfacing buses. Consequently, information leaving the work station to the printer must be serialized and data from the printer back to the work station must be deserialized into its initial parallel form. Let us assumed that the information in work station 11 has been formatted into its final form and we are ready to print the hard copy. Microprocessor 14 then has the final formatted information which has been stored in memory 17 loaded onto main bus 21 through buffer 56 for appropriate timing, and the data from main bus 21 is then loaded via bus 57 to serializer 58. Then, in serial form, to transmit buffer 59 where it awaits appropriate timing of clock signal (not shown) from microprocessor 14 to be transmitted over transmission lines 32 and 33 to the printer in serial form. Information back from the printer to the work station 11 is received in serial form over lines 34 and 35 in receive buffer 60 where again it awaits appropriate timing signals from the microprocessor 14 to be loaded into deserializer 61 then via bus 62 back to main bus 21 and to processor 14 in parallel form.

Now let us consider the operation of a secondary work station as exemplified by work station 12. When the formatting of the information has been completed and the information is now ready to be printed on the printer, the system microprocessor 15 like microprocessor 14 communicates with the memory and has the formatted information loaded on to main bus 25 from which it proceeds via bus 63 to serializer 64 where it is serialized and transmitted via line 65 to transmission buffer 66 and then on to transmission line 44 where it communicates through terminal 42 and connector 29 with line 45 of printer sharing adapter 28 where it is loaded into receive buffer 166 of the adapter. The adapter then operates under appropriate timing signals from a clock pulse generator 76 containing a counter 77 and means for generating pulses at a selected rate applied to deserializer on line 78 to load the information into deserializer 67 where by information is deserialized and put into parallel form so that it may communicate over bus 68 to main bus 21 of primary work station 11.

Then, under the control of the micropressor 14 of primary work station 11, the information at the appropriate timing is applied to serializer 58 and then to transmit buffer 59 from which it is transmitted to the printer in the same manner previously described with respect to data originating in the primary work station 11. In a similar fashion, communications from the printer 10 back to secondary work station 12 are handled in the following manner through lines 34 and 35 to receive buffer 60 to deserializer 61 as previously described, onto main bus 21 and from main bus 21 through bus 69 for the printer sharing adapter 28 to serializer 70 where the information is serialized. Then the data goes to transmit buffer 71 in printer sharing adapter 28 from which it is sent via line 46 back to receive buffer 72 of secondary work station 12. Then, the information is loaded over line 73 to deserializer 74, and then in parallel form on to bus 75 communicating with main bus 25 back to secondary work station microprocessor 15.

It may be readily observed that communication with printer 10 to and from secondary work station 13 is carried out in a similar manner through printer sharing adapter 28.

Figure 3:
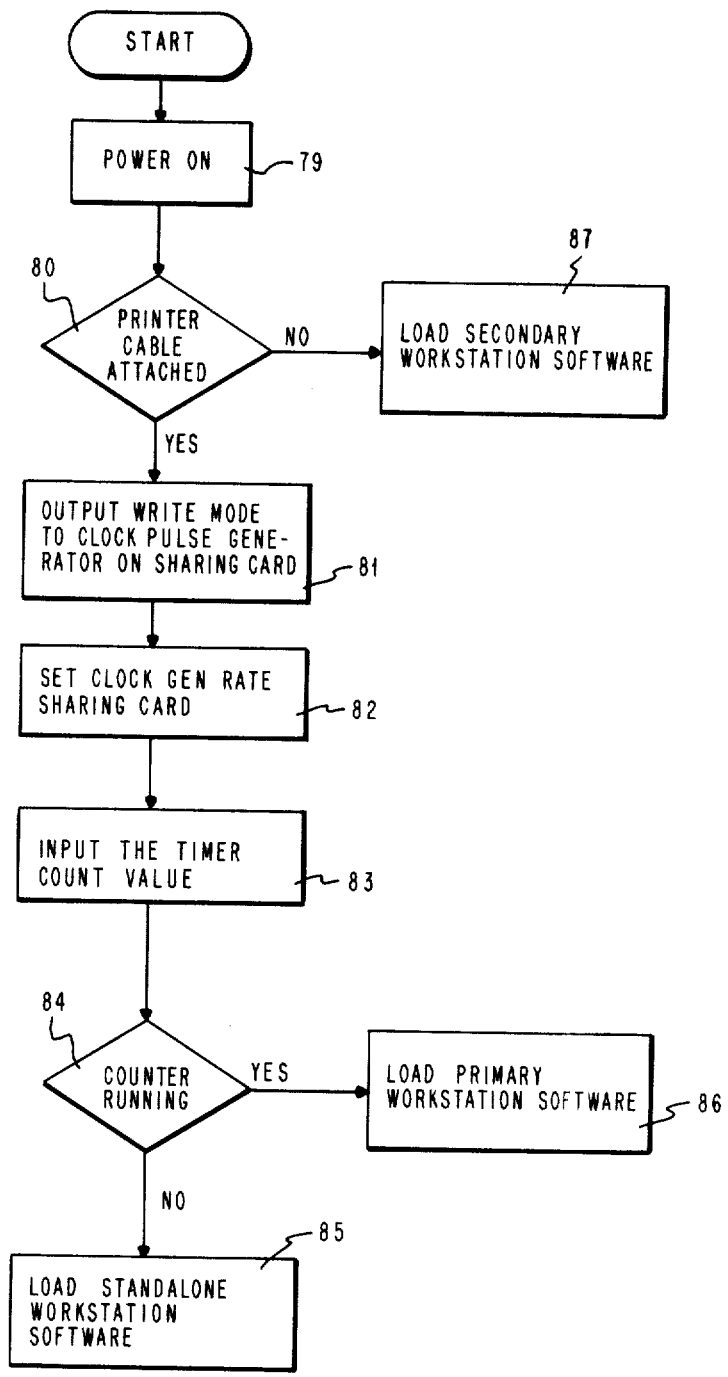
FIG. 3 is a flow chart of the process by which each display unit work station determines whether it is a primary or secondary work station.

We have now described how the system functions in the multiplexing control of the processor in the primary work station, let us now consider some of the operations carried on by the system. With reference to the flow chart of FIG. 3, we will now describe the process through which each of the work stations will go during its initialization or "power on" routine in order to determine whether or not it is a primary or secondary work station and to accordingly activate its inactive logic and memory in order to selectively operate as a primary or secondary work station. After the start of the equipment, power is turned on, block 79. Then, a determination is made, block 80 as to whether or not the display unit work station is attached directly to the printer. As previously described in detail, this involves determining the condition of its status latch, i.e., latches 41, 50 or 55 in the respective work stations in FIGS. 1 and 2. If the printer is not directly attached, then, block 87 selective programs are loaded into the work station operational memory which will control the microprocessor of the work station to operate the work station as a secondary work station. On the other hand, if the printer cable is attached, then we know that the work station is a primary work station or a stand-alone work station.

A determination has to be made as to whether it is a stand-along work station or whether it is to control printer sharing with a plurality of secondary work stations, primary work station. This is determined by instituting a routine controlled by the microprocessor 14 of the primary work station which will determine whether there are secondary work stations and a printer sharing adapter attached to the work station. This routine involves the following steps. The microprocessor 14 of the primary work station communicates with clock pulse generator 76 on printer sharing adapter 28 to set up appropriate timing for printer sharing. The clock pulse generator rate on the sharing card is set, block 82, and begins to operate. Then, block 83, the microprocessor 14 determines whether a count exists in counter 77 of clock pulse generator 76, i.e., (block 84) is the counter running? In other words, is there a clock pulse generator which has a counter? In effect, this determines whether or not a printer sharing adapter 28 is attached. If there is no printer sharing adapter attached, then there would be no counter and it would not be running. Consequently, block 85, microprocessor 14 will load appropriate software from diskette 18 into its memory 17 to permit its operation as a stand along work station.

On the other hand, if it is determined that the counter is running, i.e., there is a counter, then, this would be an indication that there are secondary work stations and, block 86, software from diskette 18 would be loaded into operational memory 17 which would permit microprocessor 14 to operate work station 11 as a primary work station controlling the multiple communication of secondary work stations to printer 10.

Figure 4:
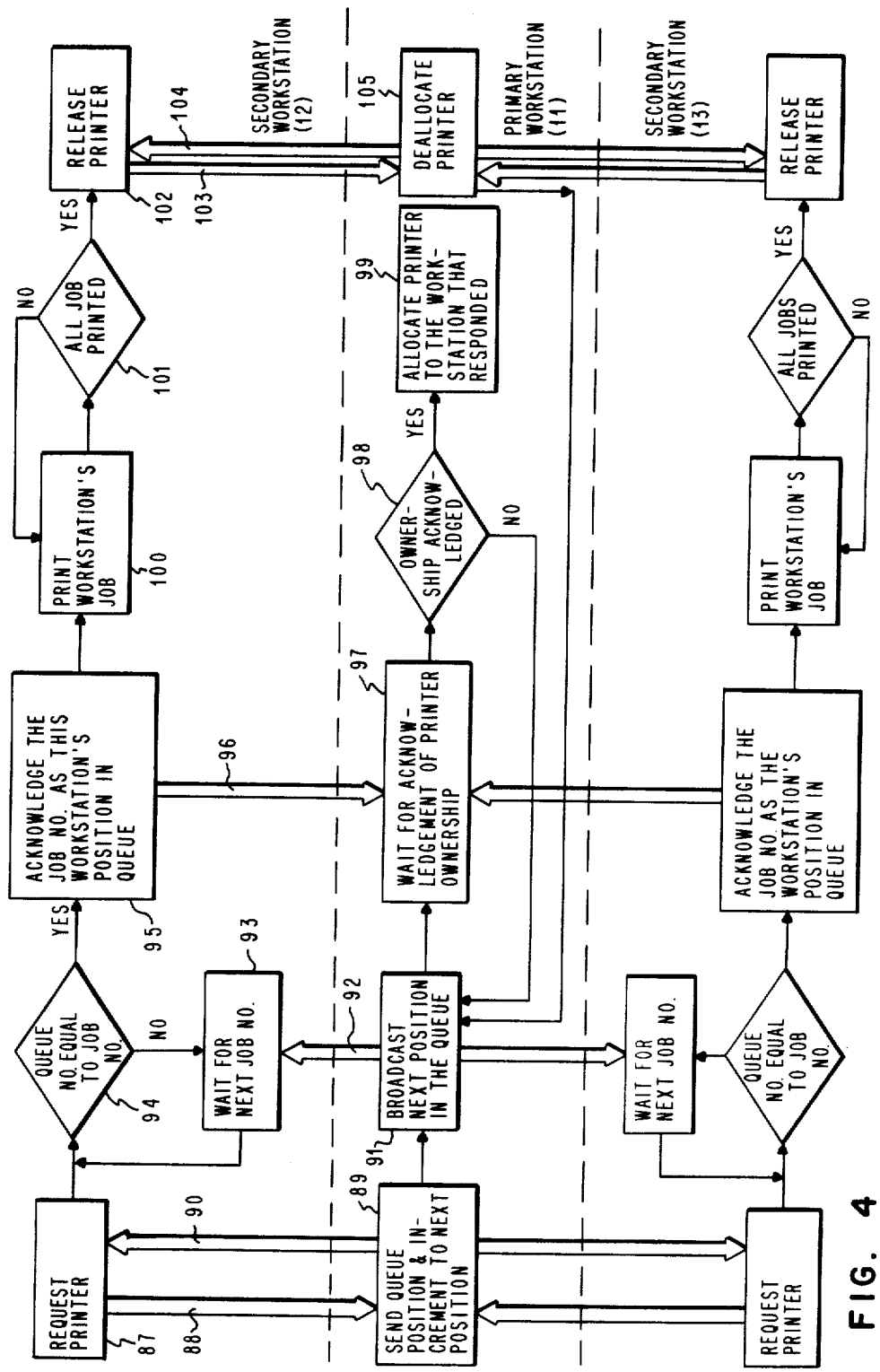
FIG. 4 is a flow chart of a typical process illustrating how the primary work station controls and allocates queueing and carrying out of jobs by a combination of work stations.

Now with respect to the flow chart of FIG. 4, we will describe a simple operation wherein the primary work station coordinates the job activity of all the work stations 11, 12 and 13. As you will note from the flow chart, process steps and channels of communications are substantially identical between each of the secondary work stations 12 and 13 and the primary work station 11. Therefore, in describing a typical job operation, we will describe the interaction between the primary work station 11 and secondary work station 12. The interaction between primary work station 11 and secondary work station 13 will be substantially identical. When the secondary work station requires the printer, it sends a request printer inquiry 87 over channel 88 to the primary work station 11. In response, the primary work station 11 sends a queue position, block 89, back to the secondary work station over channel 90 and increments to the next queue position. Having received its queue position, the secondary work station 12 waits for its turn in the following manner.

The primary work station continuously broadcasts the next positions in the queue as they are reached, block 91. This is communicated back to the secondary work station over channel 92. It should be noted the term "channels" indicate command flow. Actual communication is accomplished through the serializers/deserializers illustrated in FIGS. 1 and 2.

In the mean time, secondary work station waits for the receipt of each subsequent job number, block 93. When a job number arrives, secondary work station makes a determination as to whether its queue number is equivalent to the job number, decision block 94. If it is not, it cycles back to decision block 94 and continues to wait for the next job number. When the job number is equal the queue number, secondary work station acknowledges that the job number is this work stations position in the queue, block 95, back to the primary work station over channel 96. In the mean time, primary work station, block 97, is awaiting an acknowledgement of printer ownership, i.e., that the secondary work station's position in the queue has been reached. When this ownership is not acknowledged, decision block 98, primary work station loops back to block 91 and broadcasts the next position in the queue.

On the other hand, as in the present case, when such an acknowledgement is received by the primary work station, the printer is alllocated to the work station that has responded, i.e., in the present case secondary work station 12, block 99. Having thus obtained control over the printer, the secondary work station 12 proceeds to carry out all of its jobs, block 100. Until all the jobs are completed as determined by decision block 101, the secondary work station retains control of the printer. Upon the completion of the jobs, secondary work station releases the printer, block 102, which is communicated back to the primary work station over channel 103. At this point, the primary work station acknowledges back to the second work station that it has released the printer over channel 104, and proceeds to deallocate the printer, block 105, from the secondary work station. The primary work station then loops back to block 91 where the next position in the queue is again repetitively broadcast, and the process is continued until the next broadcast position coincides with a queue position of one of the work stations or the queue is empty.

It should be noted that the queueing procedure described above involving the coaction of the primary and secondary work station is also carried out in the primary work station when all jobs and sub-tasks involve only the primary work station.

While the invention has been particularly shown and described with reference to a preferred embodiment it will be understood by those skilled in the art that various other changes in form and detail may be made without departing from the spirit and scope of the invention.

What is claimed is:

1. In a work processing system comprising a printer and a primary display unit having a text formatting processor, means for displaying text and means for controlling said printer to print formatted text, the improvement wherein said primary display unit comprises
    means connected to said printer for controlling the sharing of said printer by said primary display unit and at least one other display unit,
    said at least one other display unit having a text formatting processor and means for displaying text and means for controlling the sharing of said printer and means for controlling said printer to print formatted text,
    said printer sharing control means in said primary display unit being inactive in the absence of another display unit connected to said primary display unit,
    means for selectively connecting said primary display unit to said at least one other display unit, and
    means responsive to said connection for activating said printer sharing control means in said primary display unit whereby said other display unit communicates with said printer through said printer sharing control means, thereby sending formatted text to said printer via said printer sharing control means.

2. The word processing system of claim 1 wherein said text formatting processor includes said printer sharing control means.

3. In a word processing system comprising a printer and a plurality of display units, each of said units having a text formatting processor and means for displaying text and means for controlling said printer to print formatted text, the improvement wherein the system further includes,
    a printer sharing adapter for connecting a first one of said plurality of display units to a second one of said plurality of display units,
    means for connecting a selected one of said display units to the printer by a first type of connecting means,
    means for connecting said selected display unit to said adapter by a third type of connecting means and
    means for connecting the non-selected display units to said adapter by a second type of connecting means, and
    each of the display units comprises
    means for controlling the sharing of said printer by said plurality of display units, said printer sharing control means being normally inactive, one said printer sharing control means being located within each of said plurality of display units, and
    means responsive to said connection by said second type of connecting means for activating the printer sharing control means in said selected display unit whereby said non-selected display units communicate with said printer through said adapter and said activated printer sharing control means in said selected display unit which functions as a primary display unit.

4. The word processing system of claim 1 wherein said text formatting processor includes said printer sharing control means.

5. The word processing system of claim 3 wherein each display unit further includes
    normally inactive means for controlling the communication of said display unit with said printer, as a secondary display unit, through printer sharing control means in a selected primary display unit.
    and means responsive to said connection by said second type of connecting means activating said communication control means.

6. The word processing system of claim 5 wherein said communication control means in each display unit is included in the text formatting processor of said unit.

* * * * *

UNITED STATES PATENT AND TRADEMARK OFFICE
CERTIFICATE OF CORRECTION

PATENT NO. : 4,525,806
DATED : June 25, 1985
INVENTOR(S) : J. G. Barnes et al

It is certified that error appears in the above—identified patent and that said Letters Patent is hereby corrected as shown below:

Column 4, line 54, "assumed" should read --assume--;

Column 7, line 14, "alllocated" should read --allocated--;

Column 7, line 46, "work" should read --word--.

Signed and Sealed this

Fourth Day of March 1986

[SEAL]

Attest:

DONALD J. QUIGG

Attesting Officer

Commissioner of Patents and Trademarks